UNITED STATES PATENT OFFICE.

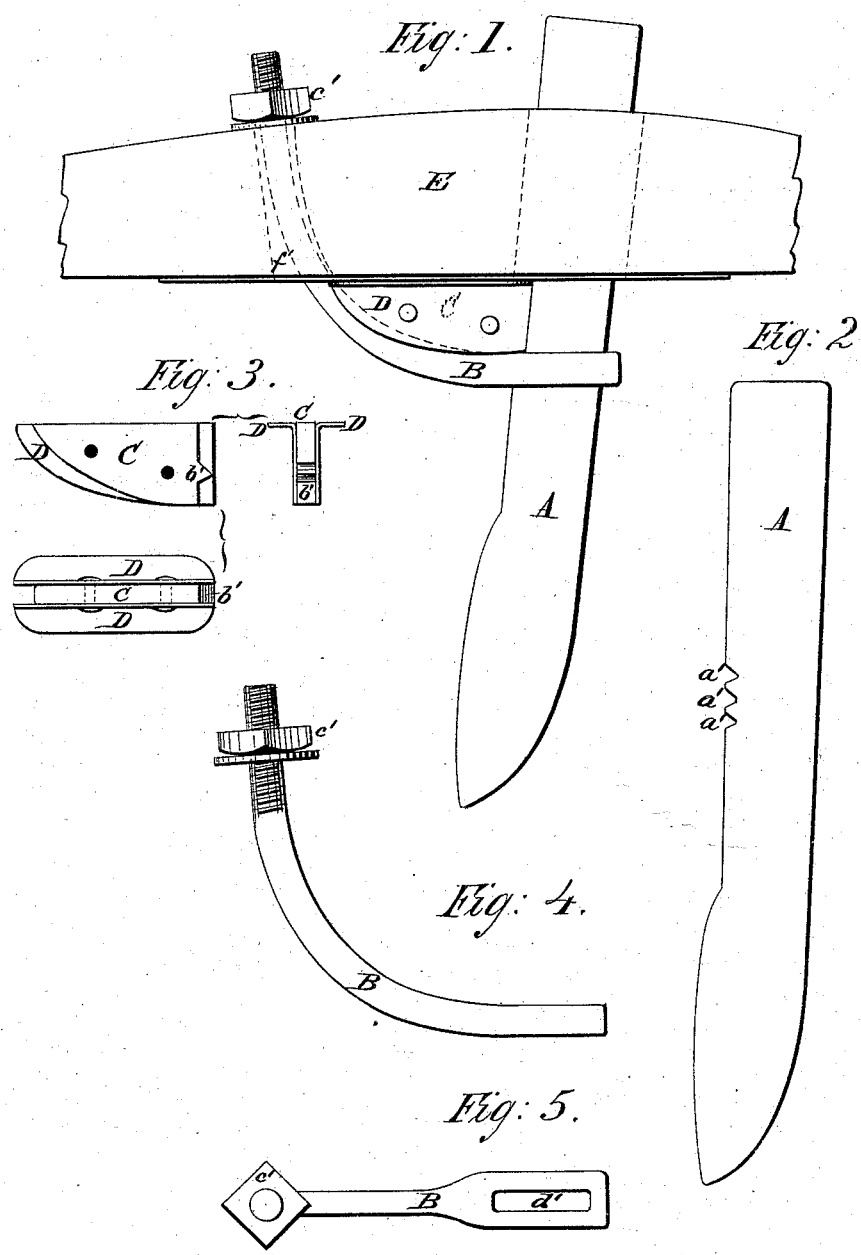

PLEASANT A. BAGWELL, OF OAKLAND, KENTUCKY.

IMPROVEMENT IN COLTER-FASTENERS.

Specification forming part of Letters Patent No. 217,043, dated July 1, 1879; application filed April 21, 1879.

*To all whom it may concern:*

Be it known that I, PLEASANT A. BAGWELL, of Oakland, in the county of Marshall and State of Kentucky, have invented a new and Improved Colter-Fastener, of which the following is a specification.

Figure 1 is a side elevation of plow-beam, colter, and fastener. Fig. 2 is a side elevation of the colter. Fig. 3 shows side, end, and plan views of the fastener. Fig. 4 is a side elevation of the brace. Fig. 5 is a plan of the brace.

Similar letters of reference indicate corresponding parts.

The object of this invention is to provide a simple, cheap, and efficient fastener for plow colters or swords.

In the drawings, A represents the colter, having teeth or notches $a'$ $a'$ on its front edge about midway of its length; B, the curved brace, having its lower end slotted and a screw-thread cut upon its upper end; C, the toothed fastener, provided with a pointed tooth, $b'$, and the flanges D D, that are secured to the sides of the fastener.

The screw end of the brace is passed up through the plow-beam E, and held by the nut $c'$; then the upper end of the colter is passed up through the slot $d'$ of the brace and the hole $f'$ in the plow-beam, so that one of its notches $a'$ $a'$ shall engage on the tooth $b'$ of the fastener, which is then set in place. The nut $c'$ is then turned down so as to draw up the brace sufficiently to bring the brace, colter-fastener, and plow-beam into close and immovable contact, and so hold them.

The flanges on the fastener serve to adjust it perpendicularly on the edge of the colter and on the brace, and to give it a broader bearing on the under side of the plow-beam. The flanges and fastener may be cast in one piece, or they may be made separately and united, as shown.

The colter may be provided with any number of notches, so that it may be vertically adjustable at any desired elevation upon the tooth $b'$ of the fastener.

This arrangement of brace and fastener reduces the leverage or strain, when working, upon the colter and beam at their point of contact, and it holds the colter so that it cannot become loose, as it ordinarily does when used in plowing heavy sods or among roots.

The device can easily be applied to any plow at a very small expense.

Having thus described my invention, I claim as new and desire to secure by Letters Patent—

1. The within-described device, consisting of colter A, provided with notches $a'$ $a'$, brace B, provided with slot $d'$ and nut $c'$, fastener C, provided with flanges D D, and tooth $b'$, in combination with the plow-beam E, substantially as herein shown and described.

2. The colter-fastener C, with flanges D D and tooth $b'$, substantially as and for the purpose described.

P. A. BAGWELL.

Witnesses:
   M. V. CHERRY,
   S. L. WILEY.